United States Patent [19]

Wakabayashi et al.

[11] Patent Number: 5,794,222

[45] Date of Patent: Aug. 11, 1998

[54] MAIL PROCESSING SYSTEM AND DEVICES THEREFOR

[75] Inventors: Naoyuki Wakabayashi; Toru Kuru; Yasushi Kawamoto; Nobuchika Menda, all of Kyoto, Japan

[73] Assignee: Omron Corporation, Kyoto, Japan

[21] Appl. No.: 712,522

[22] Filed: Sep. 13, 1996

[30] Foreign Application Priority Data

Sep. 14, 1995 [JP] Japan .................. 7-262300

[51] Int. Cl.$^6$ ................................................ G07B 17/00
[52] U.S. Cl. .................. 705/404; 283/71; 283/74; 705/30; 705/408; 705/410
[58] Field of Search .................. 209/584, 900; 235/441; 283/71, 74; 364/464.11, 464.14, 464.18, 464.2; 380/51; 382/101; 395/201, 230; 705/1, 30, 401, 404, 408, 410

[56] References Cited

U.S. PATENT DOCUMENTS

| 4,117,975 | 10/1978 | Gunn .................. 283/71 X |
| 4,377,214 | 3/1983 | Hansen et al. .................. 705/406 X |
| 4,649,266 | 3/1987 | Eckert .................. 705/408 |
| 4,725,718 | 2/1988 | Sansone et al. .................. 380/51 X |
| 4,757,537 | 7/1988 | Edelmann et al. .................. 380/51 |
| 4,775,246 | 10/1988 | Edelmann et al. .................. 380/51 X |
| 4,796,193 | 1/1989 | Pitchenik .................. 705/404 |
| 4,800,505 | 1/1989 | Axelrod et al. .................. 705/404 X |
| 4,802,218 | 1/1989 | Wright et al. .................. 380/23 |
| 4,900,904 | 2/1990 | Wright et al. .................. 705/407 X |
| 5,375,172 | 12/1994 | Chronsy .................. 380/51 |
| 5,535,127 | 7/1996 | Uno et al. .................. 705/406 |

Primary Examiner—Edward R. Cosimano
Attorney, Agent, or Firm—Keiichi Nishimura

[57] ABSTRACT

A mail processing system includes mail processing devices such as postage meters, a sorting machine and a host computer. Each mail processing device provides to each outgoing mail not only its mailing charge but also an indicator which identifies the device itself, storing such provided data in its memory device. The sorting machine reads from each received mail the data provided to it and stores such data in its memory device according to the device-identifying indicator. The computer serves to retrieve data from these memory devices to make comparisons. If the discrepancy is greater than a specified value, a warning signal is outputted as a fraud has been committed.

15 Claims, 10 Drawing Sheets

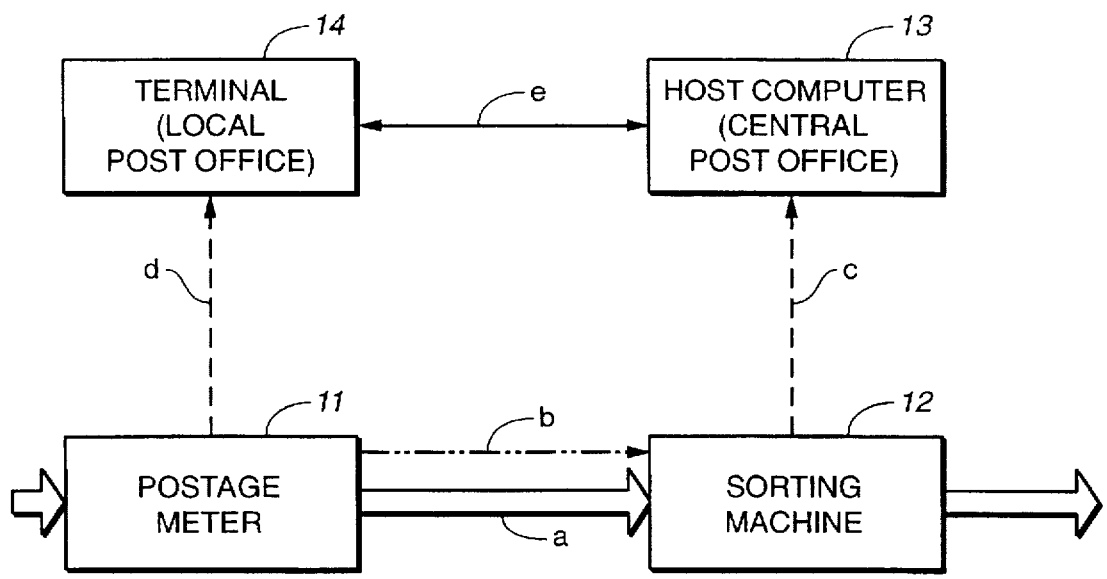
FIG._1
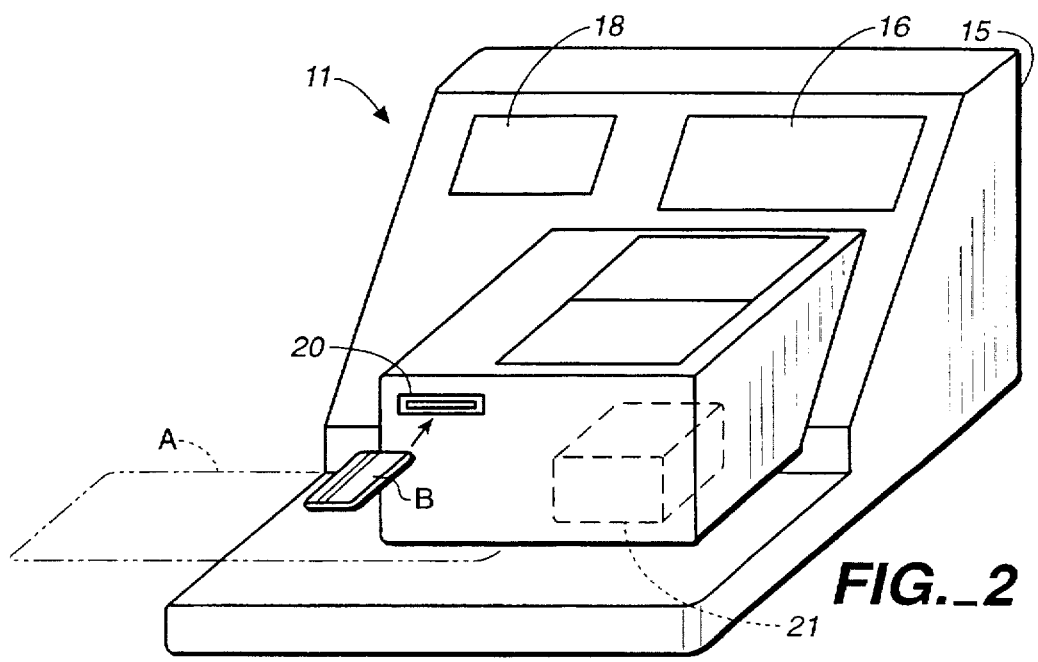
FIG._2

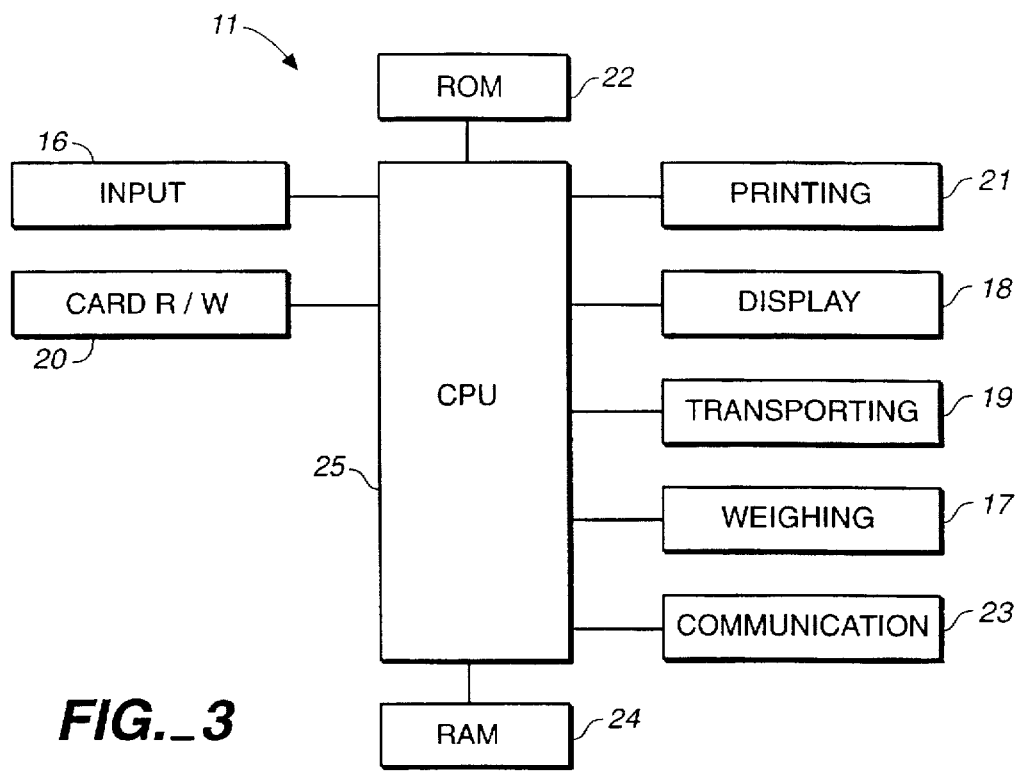
FIG._3
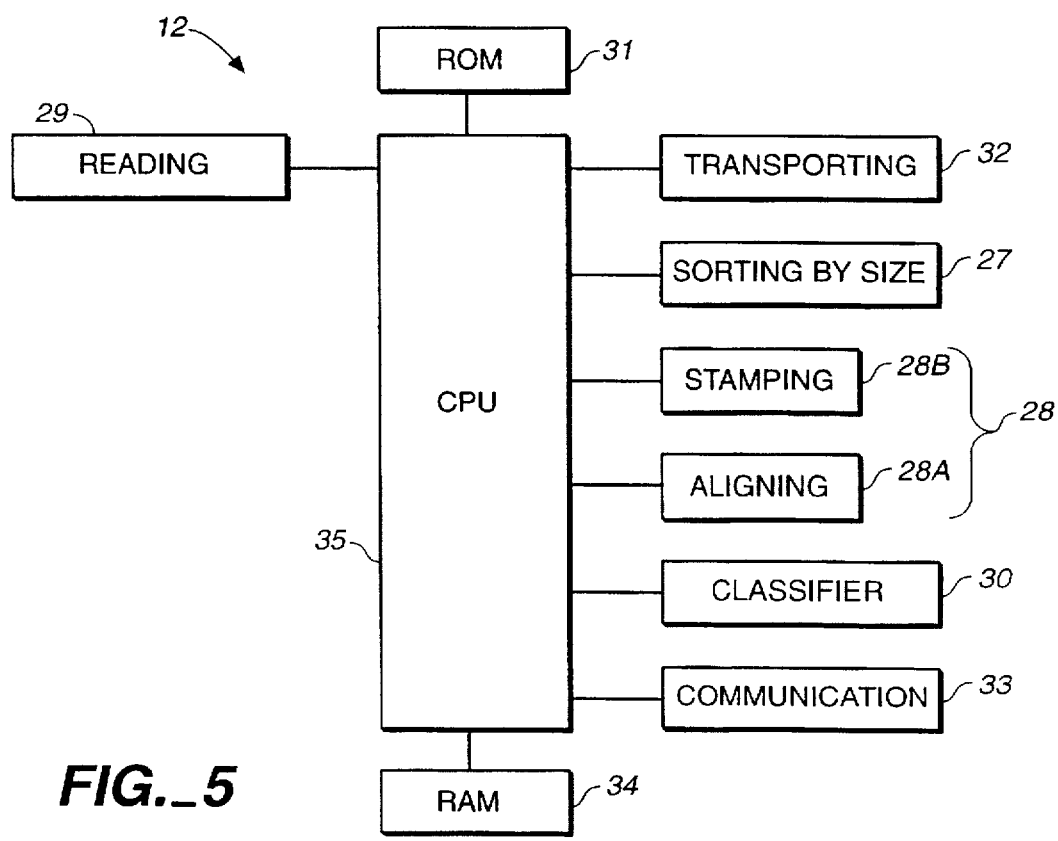
FIG._5

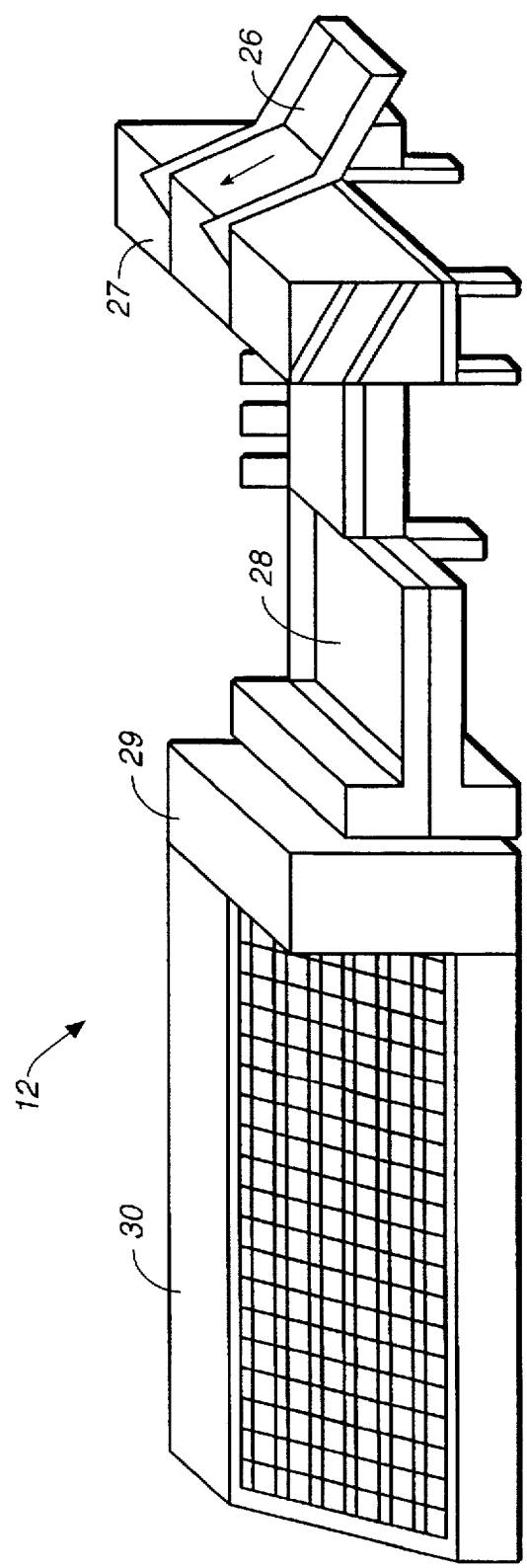
FIG._4

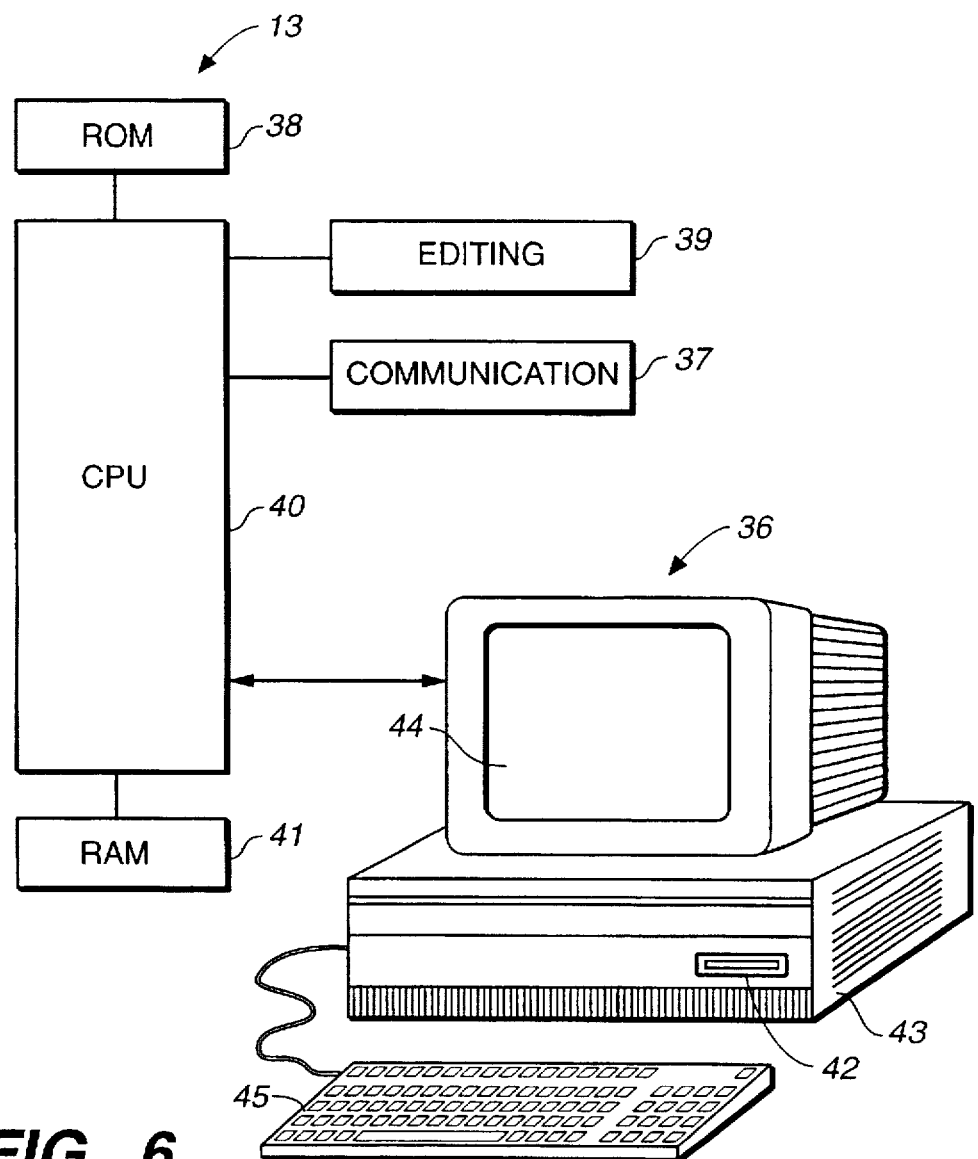
FIG._6

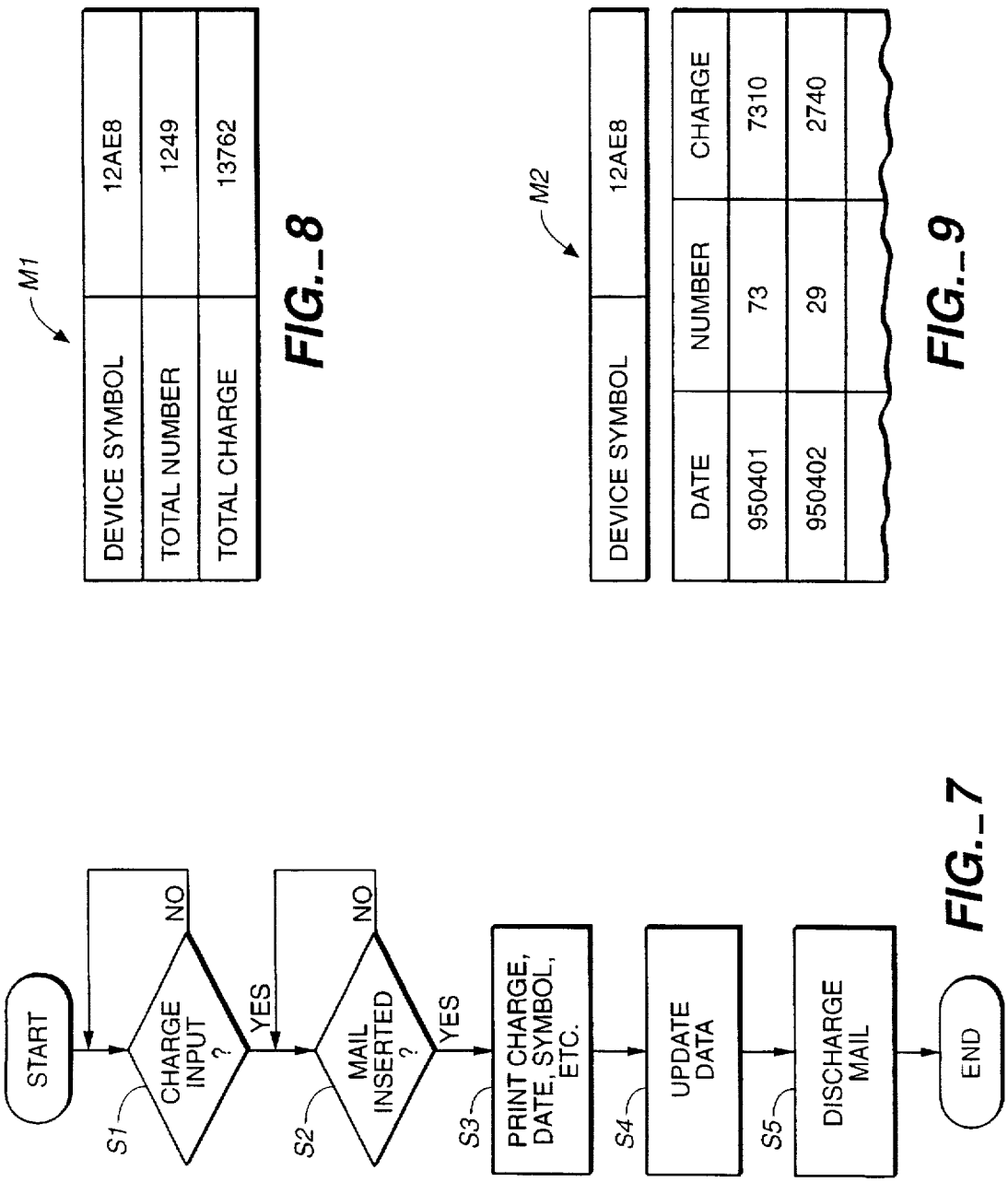

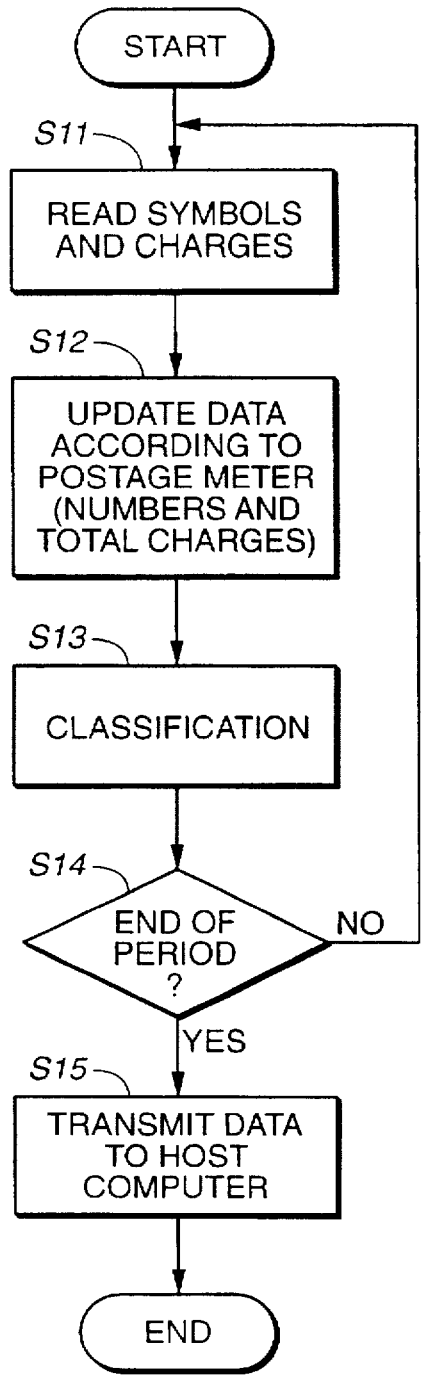
FIG._10
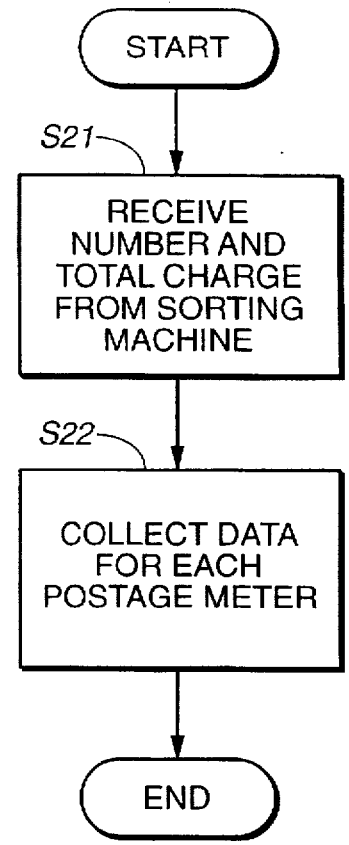
FIG._13

M3

| SYMBOL FOR POSTAGE METER | TOTAL NUMBER | TOTAL CHARGE |
|---|---|---|
| 12 A E 8 | 135 | 10240 |
| 13 B X 9 | 43 | 3960 |
| 14 C Y 5 | 81 | 7310 |
| | | |

| SYMBOL FOR POSTAGE METER | TOTAL NUMBER | TOTAL CHARGE | CUMULATIVE NUMBER | CUMULATIVE CHARGE |
|---|---|---|---|---|
| 12 A E 8 | 135 | 10240 | 3901 | 358500 |
| 13 B X 9 | 43 | 3960 | 733 | 63360 |
| 14 C Y 5 | 81 | 7310 | 1275 | 114010 |
| | | | | |

| SYMBOL FOR POSTAGE METER | TOTAL NUMBER | TOTAL CHARGE |
|---|---|---|
| 12 A E 8 | 135 | 10240 |
| 13 B X 9 | 43 | 3960 |
| 14 C Y 5 | 81 | 7310 |
| | | |

| SYMBOL FOR POSTAGE METER | DATE | NUMBER | CHARGE |
|---|---|---|---|
| 12 A E 8 | 950401 | 73 | 7310 |
| | 950402 | 29 | 2740 |
| | ⋮ | ⋮ | ⋮ |
| 13 B X 9 | 950401 | 29 | 2540 |

| SYMBOL FOR POSTAGE METER | CUMULATIVE NUMBER | CUMULATIVE CHARGE |
|---|---|---|
| 12 A E 8 | 3901 | 358500 |
| 13 B X 9 | 733 | 63360 |
| 14 C Y 5 | 1275 | 114010 |

*FIG._16*

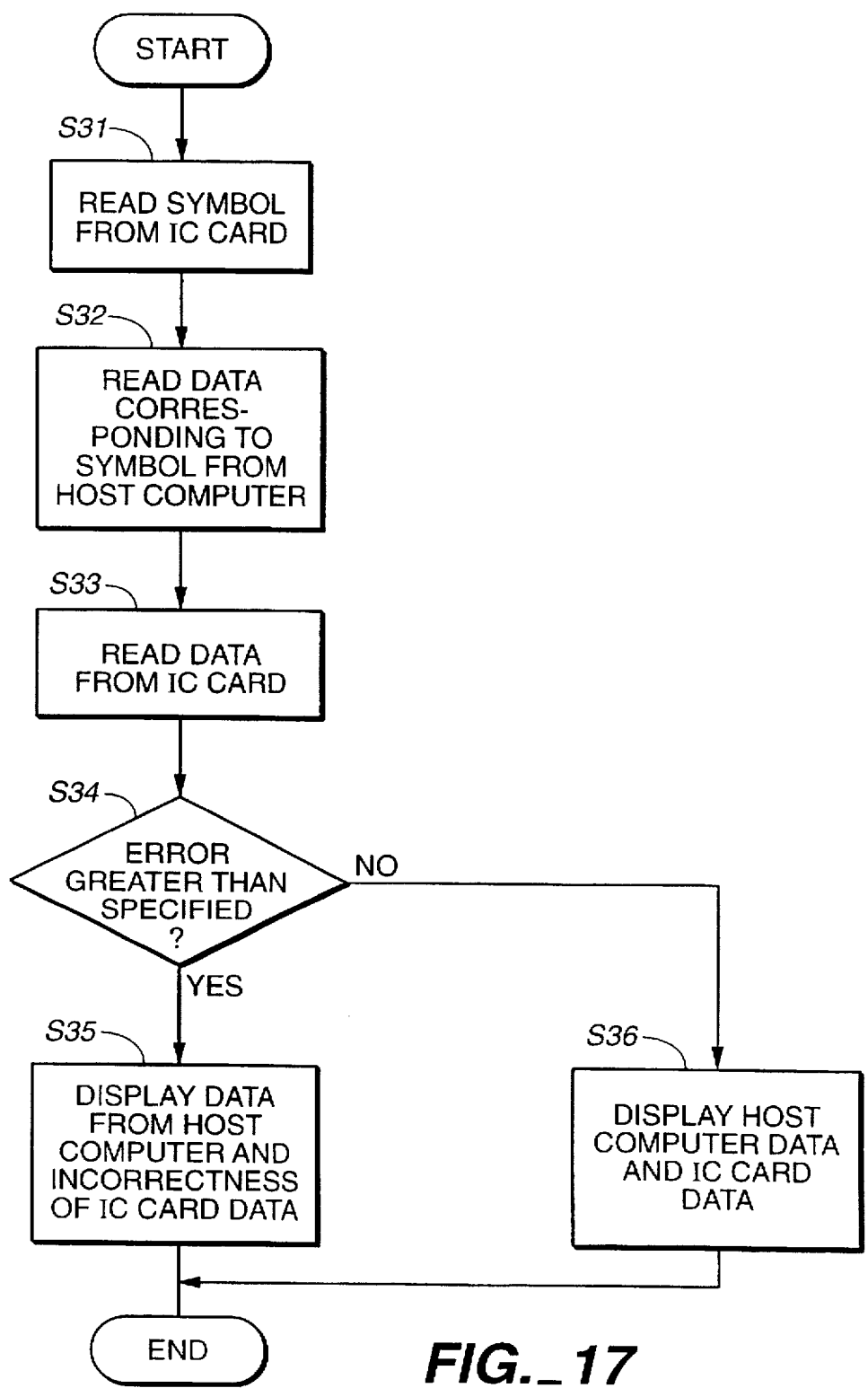
FIG._17

|  | MARCH (1-31), 1995 | |
|---|---|---|
| POSTAGE METER | 12 A E 8 | |
|  | MAILED | RECEIVED |
| NUMBER | 4213 | 4213 |
| CHARGE | Y339870 | Y339870 |
|  | PAID | Y339870 |

FIG._18

| POSTAGE METER 12 A E 8 | | | | |
|---|---|---|---|---|
| | MAILED | | RECEIVED | |
| DATE | NUMBER | CHARGE | NUMBER | CHARGE |
| 950401 | 73 | 5900 | 69 | 5700 |
| 950402 | 29 | 2540 | 30 | 2900 |
| * 950403 | 45 | 3980 | 190 | 13800 |
| ⋮ | ⋮ | ⋮ | ⋮ | ⋮ |

FIG._19

MAIL PROCESSING SYSTEM AND DEVICES THEREFOR

BACKGROUND OF THE INVENTION

This invention relates to a mail processing system for keeping records of outgoing mails and their charges, as well as devices therefor such as postage meters, a sorting machine and a host computer.

There have been mail processing systems of the kind with postage meters set at users' premises for weighing and printing out postage for outgoing mails such that postal fees can be automatically calculated and paid periodically.

With a prior art system of this kind, however, the sorting machine serving as a reading device at a post office serves only to check the presence of a certain mark on each mail. Since the postage to be paid periodically by each user is the amount outputted from his postage meter, there is an ample opportunity for a fraudulent practice, for example, by tampering the postage meter.

SUMMARY OF THE INVENTION

It is therefore a general object of this invention to provide a mail processing system capable of detecting a fraud easily.

It is a more specific object of this invention to provide a mail processing system which comprises mail processing devices such as postage meters each having a first memory means and a device-identifying indicator symbol associated with it and stored in the associated first memory means, a data-reading device such as a mail-sorting machine having a second memory means for receiving mails sent out and collecting data thereon, and a host computer for retrieving and comparing data from the first and second memory means.

It is still another object of this invention to provide a mail processing device to be used in such a system, adapted to provide each outgoing mail not only with its postage but with an indicator, or an image, which identifies the device such that, when a fraud is committed in the use of the device such as by forging its indicator, the device where the fraud was committed can be easily identified, say, as the time of calculating a total charge to be paid periodically.

It is still another object of this invention to provide a mail processing device as described above which is also capable of easily carrying out detection of a committed fraud by using as the first memory means a portable data storing medium which is easily detachable from the device.

It is still another object of this invention to provide a mail processing device as described above, of which the first memory means stores data on mails in units of specified periods of time such that committed frauds can be easily detected for each such period.

A mail processing system embodying this invention may be characterized as comprising mail processing devices adapted to determine mailing charges for outgoing mails, a data-reading device such as a sorting machine adapted to read data provided on received outgoing mails and a host computer for retrieving and comparing data from the mail processing and data-reading devices. Each of the mail processing devices includes not only a first memory means for storing data on the outgoing mails processed thereby but also a data-providing means for providing each outgoing mail with data thereon, such as its postage, as well as a device-identifying indicator which identifies the associated mail processing device. The data-reading device includes a second memory means for storing data on received mails according to the device-identifying indicators thereon provided by the data-providing means. The host computer includes a data-retrieving means for retrieving data stored in the first and second memory means.

According to a preferred embodiment of the invention, a portable memory-storing medium such as an IC card or an optical card is used as the first memory means. It may be adapted to store data in units of specified periods of time such that committed frauds can be easily detected for each such period. It may also be adapted to provide cumulative totals of processed mails such as cumulative total number of processed mails and cumulative postal charge.

The host computer may preferably include a comparing means for comparing data retrieved from the first and second memory means and a reporting means for outputting a warning if the discrepancy in the result of the comparison by the comparing means is greater than a specified value.

With a mail processing system thus structured according to this invention, frauds can be detected easily by matching data retrieved by the retrieving means from the first and second memory means.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a structural diagram of a mail processing system embodying this invention;

FIG. 2 is an external diagonal view of a postage meter serving as a mail processing device embodying this invention;

FIG. 3 is a block diagram of the control circuit for the mail processing device of FIG. 2;

FIG. 4 is a schematic diagonal view of a sorting machine according to this invention serving as a data-reading device;

FIG. 5 is a block diagram of the control circuit for the sorting machine of FIG. 4;

FIG. 6 is a system diagram of a host computer according to this invention;

FIG. 7 is a flow chart for the operation of the mail processing device of FIG. 2;

FIG. 8 is a diagram for explaining a memory map for storing data on the IC card of FIG. 2;

FIG. 9 is a diagram for explaining another memory map for storing data on the IC card;

FIG. 10 is a flow chart for the sorting machine of FIG. 4;

FIG. 11 is a diagram for explaining a memory map for storing data on the RAM of FIG. 3;

FIG. 12 is a diagram for explaining another memory map for storing data on the RAM;

FIG. 13 is a flow chart for the operation of the host computer;

FIG. 14 is a diagram for explaining a memory map for the host computer;

FIG. 15 is a diagram for explaining another memory map for the host computer;

FIG. 16 is a diagram for explaining still another memory map for the host computer;

FIG. 17 is a flow chart for the host computer terminal of FIG. 6;

FIG. 18 is a diagram for explaining an example of a display of data matching; and FIG. 19 is a diagram for explaining another example of a display of data matching.

DETAILED DESCRIPTION OF THE INVENTION

The invention will be described next in detail by way of an embodiment with reference to drawings.

FIG. 1 shows a mail processing system according to this invention, comprising a postage meter 11 set, for example, at an business place and serving as a mail processing device, a sorting machine 12 serving as a data-reading device set, for example, in a post office, a host computer 13 located at a central post office and a terminal 14 which may be set at a local post office. Mails (one of which being indicated by letter A in FIG. 2) are transported along the wide white arrow "a" shown in FIG. 1, and different kinds of data printed on each mail (such as a symbol which identifies the postage meter 11 which processed it, its charge and date) are communicated along arrow "b". Data stored in the sorting machine 12 (such as detected device-identifying indicator symbols, numbers of received mails and their charges) are communicated to the host computer 13 through arrow "c", and data stored in the postage meter 11 (such as its device-identifying indicator symbol, number of mails processed thereby and mailing charges inputted therethrough) are first transmitted to the terminal 14 as shown by arrow "d" and then to the host computer 13 as shown by arrow "e".

As shown in FIGS. 2 and 3, the main structure 15 of the postage meter 11 is provided with an input part 16 for carrying out required input operations such as classifying mails into categories such as regular mail, special delivery, registered, domestic, overseas, air mail, sea mail, regular size and oversize, and a display part 18 for displaying weight and mailing charge of the mail weighed at a weighing station (shown at 17 in FIG. 3). It further includes a transporting part 19 (shown in FIG. 3) for transporting mails along a specified path of transportation, an IC card B serving as a first memory means for storing data on the mail A and the symbol which identifies this postage meter 11, a card read-write (R/W) part 20 for reading and writing necessary data from or onto the IC card B, a data-providing means for providing the mail A with the postal charge and the device-identifying symbol for this postage meter 11 in the form of a mark (or an image), and a printing part 21 serving as a means for printing out a cumulative sum. A rotary press adapted to contact the surface of the mail A or an ink jet printer of a non-contact type separated from the surface of the mail A may be used as the printing part 21.

The printing part 21, the display part 18, the transporting part 19 and the weighing part 17, as well as a communication part 23 (to be described below), are controlled by a CPU 25 according to a program stored in a ROM 22 on the basis of inputted signals from the input part 16 and the card R/W part 20. Necessary data and a memory map are stored in a RAM 24. The IC card B, serving as the first memory means, stores the memory map M1 shown in FIG. 8 or the memory map M2 shown in FIG. 9.

The memory map M1 shown in FIG. 8 is used for storing the device-identifying indicator symbol for the postage meter 11 such as "12AE8", the total number of processed mails ("Total Number") and the total postal charge ("Total Charge") when only the cumulative total charge is to be stored. The memory map M2 shown in FIG. 9 is used for storing the symbol for the postage meter 11 such as "12AE8" and the data collected each day on the number and charge of the mails.

The sorting machine 12, serving as the data-reading device as explained above, is structured as shown in FIGS. 4 and 5, having in order from the right to the left (with reference to FIG. 4) a mail-receiving tray 26, a sorting (by size) part 27 for separating oversize mails from regular size mails, an aligning-stamping part 28 having at the same place both an aligning unit 18A (shown in FIG. 5) for aligning collected mails A and a stamping unit 18B (shown in FIG. 5) for date-stamping them, a reading part 29 for using an image processor or a bar code reader to detect a stamped image and a postal zone number, and a classifier 30 for automatically sorting the mails A according to the detected postal zone numbers.

As shown in FIG. 5, operations of a transporting part 32 for controlling the transportation of mails from the mail-receiving tray 26 (shown in FIG. 4) to the classifier 30, the sorting part 27, the stamping unit 28B, the aligning unit 28A, the classifier 30 and the communication part 33 for controlling the communication of necessary data to the host computer 13 are controlled by a CPU 35 on the basis of signals received from the reading part 29 as well as an input part (not shown) according to a program stored in a ROM 31. Required data on the number and charge are stored on a RAM 34, in the form of the memory map M3 shown in FIG. 11 or the memory map M4 shown in FIG. 12, corresponding to individual device-identifying indicator symbols provided to the mails as a mark (or an image) by the data-providing means.

The memory map M3 shown in FIG. 11 is used for storing the total number of processed mails ("Total Number") and the total postal charge ("Total Charge") corresponding to each of the device-identifying indicator symbols for the postage meters 11 (although only one of them is shown) such as "12AE8", "13BX9" and "14CY5" when only the cumulative charges are to be stored. The memory map M4 shown in FIG. 12 is used for storing the cumulative numbers and charges in addition to the aforementioned total numbers and total charges corresponding to the symbols of the postage meters 11 such as "12AE8", "13BX9" and "14CY5". The RAM 34 which is thus adapted to selectively store the memory map M3 or M4 serves as the aforementioned second memory means.

The host computer 13 and its terminal 36 are structured as shown in FIG. 6. The host computer 13 has a CPU 40 with a ROM 38 and a RAM 41 and is connected to a data editing part 39 and a communication part 37. The CPU 40 controls the data editing part 39 according to a program stored in the ROM 38 and on the basis of various signals inputted from the sorting machine 12 through the communication part 37 and the terminal 36 such that the data editing part 39 will retrieve the memory map M5 shown in FIG. 14, the memory map M6 shown in FIG. 15 or the memory map M7 shown in FIG. 16. The RAM 41 serves to store data such as those related to large discrepancies, as will be explained below.

The host computer terminal 36, connected to the host computer 13 and the sorting machine 12, comprises an opening 42 for accepting the IC card B, a reading part 43 including a card reader (not shown) set at the deeper end of the opening 42, a display part 44 which may include, for example, a CRT placed above the reading part 43, and a keyboard 45 with many keys for allowing various input operations to be carried out. It is also provided with a CPU, a RAM and a ROM (not shown).

The memory map M5 shown in FIG. 14 is used for editing and storing the total number of processed mails ("Total Number") and the total postal charge ("Total Charge")

corresponding to each of the device-identifying indicator symbols for the postage meters 11 such as "12AE8", "13BX9" and "14CY5 ". The memory map M6 shown in FIG. 15 is used for editing and storing data (such as numbers and charges) collected by the sorting machine 12 each day corresponding to each of the device-identifying indicator symbols for the postage meters 11 such as "12AE8 " and "13BX9". The memory map M7 shown in FIG. 16 is used for editing and storing the cumulative total number of processed mails and the cumulative total postal charge corresponding to each of the device identifying indicator symbols for the postage meters 11 such as "12AE8", "13BX9" and "14CY5 ".

The CPU (not shown) of the host computer terminal 36 serves both as a comparing means for performing the comparison in Step S34 in the flow chart of FIG. 17 (to be described below) and an error reporting means for outputting an error signal in Step S35 in the flow chart of FIG. 17 (to be described below).

Operations of the mail processing system thus structured will be described next in detail with reference to the flow charts of FIGS. 7, 10, 13 and 17.

First, the operations of the postage meter 11 are explained with reference to the flow chart of FIG. 7. After the IC card B is inserted into the opening of the card R/W part 20, the CPU 25 determines whether there was an input of a postal charge from the input part 16 (Step S1). If it is NO, it waits for an input. If it is YES, the CPU 25 uses a mail sensor (not shown) or the like to determine whether a mail A has been inserted into a specified part of the postage meter 11 shown in FIG. 2 (Step S2). If it is NO, it waits for the insertion of a next mail. If it is YES, the CPU 25 transports the inserted mail A to a position below the printing part 21 and then operates the printing part 21 to print the mailing charge (money amount), the date, the indicator symbol for identifying this postage meter 11, etc. at a specified image-providing position on the mail A either by a contacting method or by a non-contacting method (Step S3). Next, the CPU 25 operates the card R/W part 20 to update the data in the memory map M1 (of FIG. 8) or M2 (of FIG. 9) of the IC card B already inserted into its inlet opening (Step S4). In order words, the total number of processed mails is increased by +1 and the presently charged amount is added to the previous total charge. Next, the CPU 25 operates the transporting part 19 to discharge the mail A provided with a printed image, thereby ending the series of operations by the postage meter 11 (Step S5).

The mail A thus processed by the postage meter 11 is transported to the sorting machine 12. Next, the processes by the sorting machine 12 are described with reference to the flow chart of FIG. 10.

The mail A delivered to the sorting machine 12 is received in the mail-receiving tray 26 and reaches the reading part 29 by passing through the sorting part 27 and the aligning-stamping part 28. Although only one mail is shown, mails from many different places are actually delivered. First, the CPU 35 operates the reading part 29, and the various data contained in the image on the mail A (such as the symbol which identifies the postage meter 11 and the charge, as well as cumulative data if they are to be calculated) and the postal zone number are read (Step S 11). Next, the CPU 35 updates the data in the memory map M3 (of FIG. 11) or M4 (of FIG. 12) on the RAM 34 serving as the second memory means according to the device-identifying indicator symbol for the corresponding postage meter 11 (Step S12). In other words, the total number of received mails is increased by +1, and the presently charged amount is added to the previous total charge. If cumulative values are to be calculated as in the case of FIG. 12, the cumulative number and the cumulative charge are also updated. Next, the CPU 35 distributes the received mails A into various compartments of the classifier 30 according to the postal zone numbers which have been read earlier (Step S13) and then determines whether a preliminarily specified accounting period (such as a day, a week or a month) has passed (Step S14). If it is NO, the system returns to the first step S11 and repeats the processes in the first through third steps S11–S13. If it is YES, the CPU 35 operates the communication part 33 to send to the host computer 13 the data on the RAM 34, that is, the data on the memory map M3 (shown in FIG. 11) or M4 (shown in FIG. 12) (Step S15), thereby completing the series of processes by the sorting machine 12.

Next, the processes by the host computer 13 are described with reference to the flow chart of FIG. 13. First, the CPU 40 operates its communication part 37 to receive the data (such as the device-identifying indicator symbol for the postage meter 11, the total number and the total charge) on the memory map M3 or M4 from the sorting machine 12 (Step S21). Next, the CPU 40 operates the editing part 39 to collect data for individual postage meters each for the corresponding symbol according to the memory map M5 (of FIG. 14), M6 (of FIG. 15) or M7 (of FIG. 16) (Step S22).

Next, the processes by the host computer terminal 36 are described with reference to the flow chart of FIG. 17. First, after the IC card B (shown in FIG. 2) is inserted into the opening 42 in the reading part 43 of the terminal 36, its CPU (not shown) operates a card reader, or the like, to read the device-identifying indicator symbol off the inserted IC card B (Step S31). Next, the CPU reads out data corresponding to the retrieved symbol from the editing part 39 of the host computer 13 (Step S32) and the data in the memory map Ml (shown in FIG. 8) or M2 (shown in FIG. 9) from the IC card B (Step S33). The processes in the Steps S31 and S33 may be carried out simultaneously as a single step. Next, it is determined whether or not there is a difference greater than a specified value between these numbers or charges of outgoing mails processed by the postage meters 11 and mails received by the sorting machine 12 (Step S34). This is to take into account the time lag between the processing by the postage meters 11 and the sorting machine 12, and differences (or errors) due to such a time lag are to be ignored. If the question in Step S34 is YES, the CPU causes the display part 44 to display, for example, an asterisk (*) serving as a warning symbol, as shown in FIG. 19, to indicate that there is an unreasonably large difference between a data item collected and edited by the host computer 13 and one on the IC card B and hence that there must have been a fraud (Step S35). If the difference is less than a specified critical value or if there is no error and it is NO in Step S34, the display part 44 is caused to display, as shown in FIG. 18, for example, that the difference between these data is sufficiently small, indicating that there is no reason to suspect a fraud (Step S36). FIGS. 18 and 19 show examples of displays on the display part 44. FIG. 18 shows an example when there is no large difference (or a matching display), and FIG. 19 shows an example of daily comparison display with a large difference at one of the postage meters.

With a mail processing system according to this invention as described above, the printing part 21 of the postage meter 11 provides each mail with a symbol which identifies the meter 11 as its postage is determined. The first memory means (or the IC card B) stores data on the mails, and the sorting machine 12 reads these data provided to the mails as they are sorted. The second memory means (or the RAM 34) of the sorting machine 12 stores data on the mails received thereby according to the symbols provided thereto by the printing part 21. The host computer 13 collects data from the postage meters 11 and the sorting machine 12, and its editing means (or the editing part 39 and the host computer terminal 36) collects the data stored in the first memory means and the second memory means. As a result, a fraud can be easily detected by comparing these data from the first memory means (or the IC card B) collected by the editing means (or the elements 36 and 39) of the host computer 13 and from the second memory means (or the RAM 34). If any of the data (number or charge) from the second memory means (or the RAM 34) of the sorting machine 12 is larger than the corresponding data item from the first memory means of a postage meter 11, for example, it may be concluded that there was a fraud involving forgery of the printed image or tampering of the postage meter.

Many modifications and variations of the example described above are intended to be within the scope of this invention. For example, the host computer terminal 36 shown in FIG. 6 need not be at a central post office but may be placed at a local post office. A postage meter may be connected online to a host computer. Systems according to this invention may be adapted for pre-paying users, the display part being adapted to display the current balance.

What is claimed is:

1. A mail processing system comprising:

mail processing devices each adapted to provide mailing charges to mails processed thereby, having a first memory means for storing data on said mails and a data-providing means for providing said processed mails with a device-identifying indicator serving to identify said each mail processing device;

a reading device capable of reading from said mails data provided thereto by said data-providing means, said reading device including a second memory means for storing data according to said device-identifying indicator provided to said mails; and a computer for collecting data from said mail processing device and said reading device, including a retrieving means for retrieving data stored in said first memory means and data stored in said second memory means.

2. The mail processing system of claim 1 wherein said first memory means stores data on mails for each of specified periods of time.

3. The mail processing system of claim 1 further comprising a cumulative data-providing means for providing said mails with cumulative sums of processing carried out by said mail processing device.

4. The mail processing system of claim 1 wherein said computer includes a matching means for matching data stored on said first memory means on mails provided to mails and data on mails stored on said second memory means corresponding to each of said mail processing devices.

5. The mail processing system of claim 1 wherein said computer includes:

a comparing means for comparing data received from said first memory means and data received from said second memory means; and a reporting means for making a report if said comparing means detects a discrepancy greater than a specified value.

6. The mail processing system of claim 1 wherein said first memory means is portable and detachable from said mail processing device.

7. The mail processing system of claim 6 wherein said first memory means stores data on mails for each of specified periods of time.

8. The mail processing system of claim 1 wherein said computer includes a data-retrieving means for retrieving from said first memory means data on mails provided to mails and retrieving data on mails stored on said second memory means corresponding to each of said mail processing devices.

9. The mail processing system of claim 8 wherein said computer is connected to a computer terminal, said first memory means is portable and detachable from said mail processing device, and said data retrieving means retrieves data indirectly from said portable and detachable first memory means through said computer terminal.

10. A mail processing device adapted to provide mailing charges to mails processed thereby, said mail processing device comprising:

a first memory means for storing data on said mails; and a data-providing means for providing processed mails with a device-identifying indicator serving to identify said mail processing device, said mail processing device being capable of being used as a part of a mail processing system which includes:

a reading device capable of reading from mails data provided thereto by said data-providing means, said reading device including a second memory means for storing data according to said device-identifying indicator provided to said mails; and a computer for collecting data from said mail Processing device and said reading device, including a retrieving means for retrieving data stored in said first memory means and data stored in said second memory means.

11. The mail processing device of claim 10 wherein said first memory means stores data on mails for each of specified periods of time.

12. The mail processing device of claim 10 further comprising a cumulative data-providing means for providing said mails with cumulative sums of processing carried out by said mail processing device.

13. The mail processing device of claim 10 wherein said first memory means is portable and detachable from said mail processing device.

14. The mail processing device of claim 13 wherein said first memory means stores data on mails for each of specified periods of time.

15. The mail processing device of claim 14 further comprising a cumulative data-providing means for providing said mails with cumulative sums of processing carried out by said mail processing device.

* * * * *